Dec. 26, 1950     F. EICHINGER     2,535,399
METHOD AND MEANS FOR PRINTING PHOTOGRAPHIC
OR KINEMATOGRAPHIC FILMS
Filed Nov. 22, 1946     2 Sheets-Sheet 1

Inventor:
Ferdinand Eichinger
by
Young, Emery, Thompson,
Attorneys.

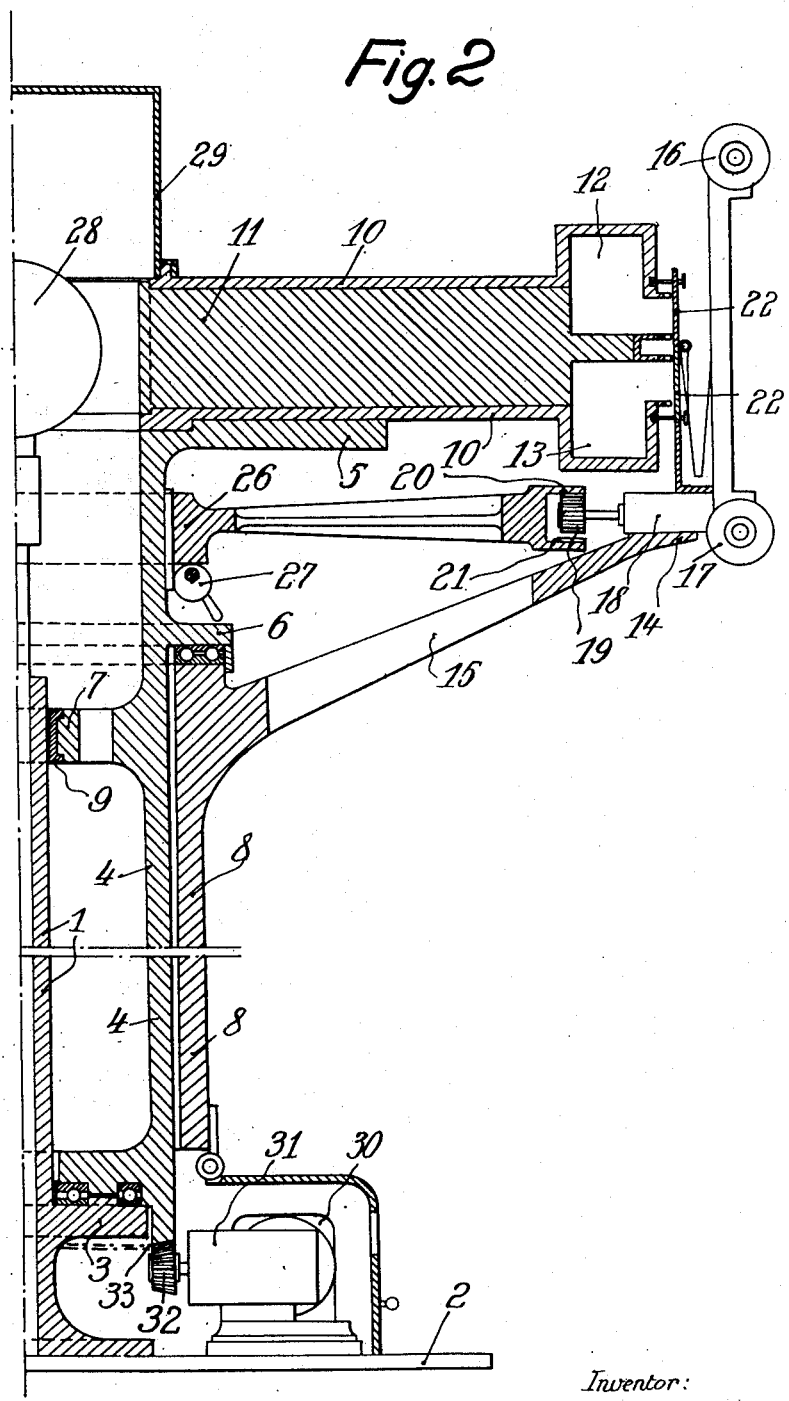

Patented Dec. 26, 1950

2,535,399

UNITED STATES PATENT OFFICE 2,535,399

METHOD AND MEANS FOR PRINTING PHOTOGRAPHIC OR KINEMATOGRAPHIC FILMS

Ferdinand Eichinger, Asnieres, France

Application November 22, 1946, Serial No. 711,550
In Luxemburg November 23, 1945

6 Claims. (Cl. 95—75)

This invention relates to a method and apparatus for the printing of copies of photographic and kinematographic films.

Heretofore, methods and apparatus for the printing of a plurality of copies of films from a single negative have been devised. In such prior art methods and apparatus the number of copies that could be printed is limited.

An object of this invention is to provide a method and apparatus which avoid the disadvantages of the prior art.

Another object of the invention is to move a negative or master film in a circular path about a light source; to simultaneously move a plurality of unexposed copy films in printing relation with the negative or master film through portions of said circular path; and to feed and withdraw the copy films in directions at an angle to the plane of said circular path of movement of the master film, the copy films being looped and twisted from the direction of feed to the direction of travel with the master film and back to the direction of withdrawal.

A further object of this invention is to move a pair of negative or master films in circular paths about a light source, the planes of which paths are spaced and parallel, to simultaneously move a plurality of unexposed copy films first in printing relation with one master film and subsequently in printing relation with the second master film, and to feed and withdraw the copy films in directions at an angle to the planes of the circular paths of the master films, the copy films being twisted and double looped from their direction of feed to printing position with both master films and back to the direction of withdrawal.

Still another object of this invention is to provide a printing machine comprising a rotating drum carryiyng an optical element included between two discs of which the outer rim is provided with sprocket teeth for drawing the master film to be printed and the copies, which drum is mounted on a holder to which are attached means for the positioning of the feed and take-up sprockets for the master film to be printed and for the copies, said drum being also provided with a central opening in which is arranged a suitable light source, said drum also having means for driving said sprockets in a counter-clockwise or clockwise direction, and presser-bars fitted on the machine for ensuring contact between the master film to be printed and the copies.

Other objects will appear from the disclosure set forth hereinafter and in the drawings.

In the drawings:

Figure 2 is a vertical sectional view through the axis of the device.

Figure 1:
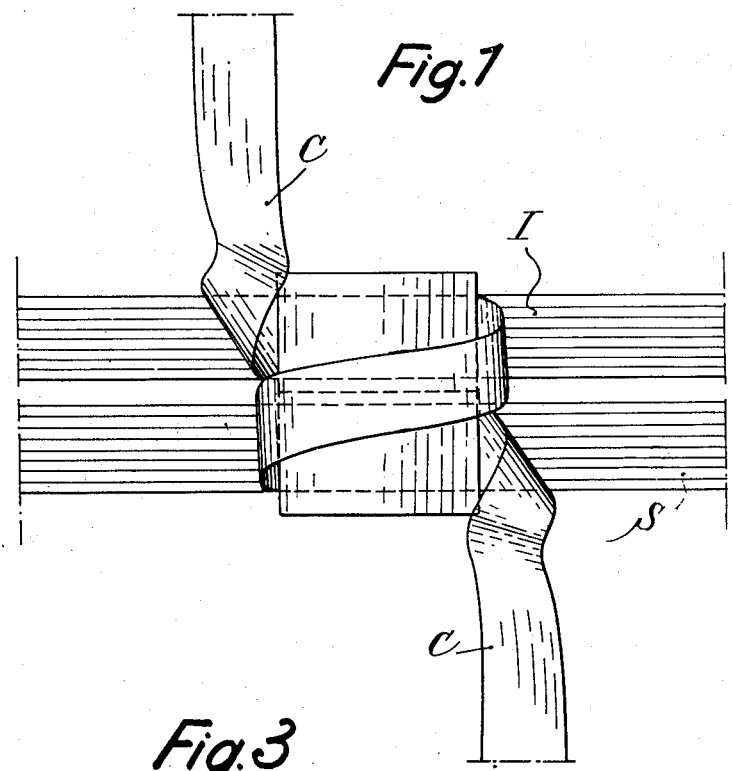
Figure 1 is a diagrammatic view showing the principle of the invention.

The drawings show diagrammatically in Figure 1, the method forming the object of the invention that consists in the unrolling of the negative master picture film I and of the negative master sound film S to be printed in one direction, for instance, from left to right and of one of a plurality of sensitive copy films C from top to bottom. It is easy to understand that it is possible to arrange in a given space for as many copy films as there are copies to be printed simultaneously.

With a view to the practical adaptation of this method and in order to set up a printing machine that allows the simultaneous delivery of for example fifteen reproductions, of a film, the procedure is substantially as follows:

By the use of suitable materials, preferably a light metal or light alloy, the parts are fitted together and arranged in the following manner.

A column 1, preferably hollow, fixed rigidly to a platform 2 is provided near its base with an annular flange 3 acting as a support for a column 4 that is concentric with it. Column 4 carries on its upper end a circular table 5, and is provided with an outer flange 6, and an inner flange 7. A column 8 concentric with the columns 1 and 4 is fixed rigidly to the platform 2. Column 4 bears on the columns 1 and 8, on the one hand by suitable bearings and is guided through the flange 7 and the bushing 9 on column 1.

On the table 5 is fixed a ring-shaped rotating drum 10 including an annular optical member 11 and annular chambers 12 and 13 of which the outer edges are furnished with sprocket teeth for the simultaneous drawing of the films to be printed and of the copies. The chamber 13, is intended for instance, for the printing of the sound film and the chamber 12 for that of the picture film.

On a ring 14 fastened by arms 15 to the column 8, are arranged devices adapted to feed the machine with copy films, such devices are formed for instance by sprocket spools 16 and 17, the rotation of which is ensured by a suitable mechanism 18 of which the bevel pinion 19 may engage either a bevel ring gear 20 or a bevel ring gear 21, these rings rotating in unison with the column 4, on which their hub is mounted with a long key.

Presser-bar devices 22 allow the films to be printed and the copy films to travel suitably through the machine, as shown in Fig. 1.

Around the machine are arranged a number of copy film feed devices equal to the number of copies that are required simultaneously off the same film.

Figure 3:
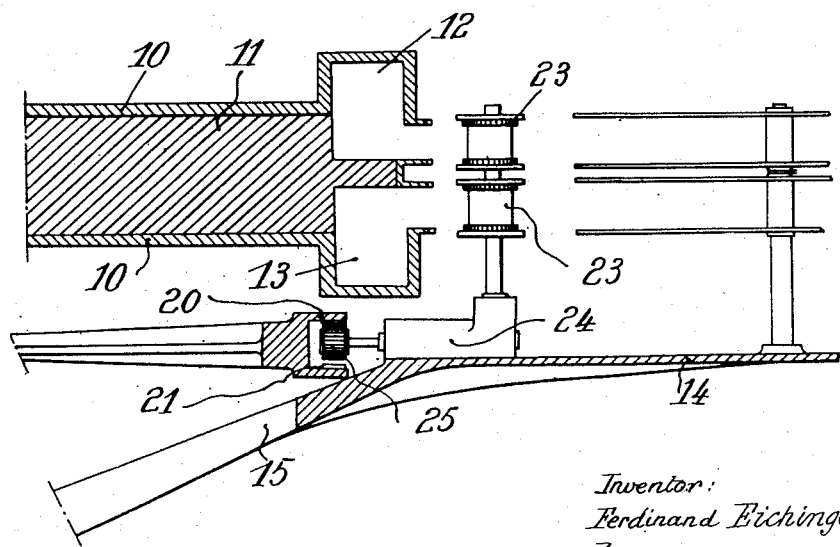
Figure 3 is an enlarged sectional view also through the axis of the device.

As shown in Fig. 3 of the drawings, at a point of the ring 14 made for this purpose is arranged a mechanism for the unrolling and rewinding of the master films to be printed, which mechanism carries two sprockets 23, set on a spindle made to revolve by suitable mechanical means 24 of which the bevel pinion 25 may be engaged, either by the bevel ring gear 20 or by the bevel ring gear 21.

These bevel ring gears 20 and 21 may be brought into contact with the pinions 19 and 25 because their common hub 26 may be raised or lowered through one or several devices such, for instance, as the eccentric 27 shown in Fig. 2. It goes without saying that a means for locking may advantageously be provided on the machine in order to hold the hub 26, and thus the bevel ring gears 20 and 21, in one of the two positions that it can be made to take in order, either to reprint from the master film to be printed a new series of copies, or to re-reel it on the spool so that it can start from the beginning again without being taken off the machine.

In the centre of the machine, a suitable light source 28 is arranged in such a way that its emission focus lies in the medial plane of the optical member 11.

A hood 29 is put on the rotating drum 10 to mask the centre of this drum.

The machine may be actuated by hand with a crank handle, but it is far more convenient to operate it with an electric motor 30 and through a speed reducer 31, of which the pinion 32 is engaged with a toothed ring 33 provided at the base of the rotating column 4.

The working of the machine that has been described is easy to understand; in fact, by merely looking at the drawing it can be realised that the master picture film to be printed and the master sound film are put on the drum 10 and in front of each copyholder is put the copy film to be impressed. As shown in Figure 1, the perforations of the master films to be printed and those of the copies taking up the same points at the time of the travel through of the films to be printed; it is thus safe to draw the films without any danger of tearing the films or of damaging the perforated edges.

A convenient arrangement can be made with the use of a photo-electric cell, for instance hung from the hood 29 that, through the agency of a standard method, breaks the circuit of the motor 30 when the intensity of the light source dims or when the light source fails.

The existence of this photo-cell allows the at least part avoidance of wastage of the copy films.

Conveniently too, the inner surfaces of the sides of the drum 10 in contact with the optical member are made of a reflective material through any suitable method or means.

Naturally the machine is provided with a protecting casing not shown in the drawing.

The machine that forms the object of the present invention is a most economical one; in fact it can be executed as disclosed so that the net price of the reproductions got from this machine is especially low, under similar conditions; its handling only calls for the employment, in respect of the number of reproductions put out in a given time, of a limited attendance, that need not even be highly expert.

The invention, of course, is not restricted to that form of construction that has been particularly set forth herein and illustrated in the drawing, but it includes all modifications, especially that where the peripheral surface furnished with sprocket teeth and arranged in the central plane of the optical member, is set in such a way as to be able to slide angularly, with a view to ensuring the proper drawing of the films, in spite of certain irregularities in the spacing of the perforations of the films to be drawn.

What I claim is:

1. A printing machine for photographic and kinematographic films comprising a rotary hollow drum, a source of light inside same, an at least part cylindrical optical member lying substantially in a plane perpendicular to the drum and passing through the source of light, means for engaging the films to be printed over the periphery of the drum in front of the optical element, a feed and a take up spool for said films in front of the corresponding ends of the passage thereof in front of the optical element, means whereby the rotation of the drum controls the unwinding of the film to be printed from one spool to the other in at least one selected direction, a series of couples of feed and take up spools arranged on opposite sides of the path of the film to be printed in front of the optical element and adapted to provide for the unwinding and rewinding of corresponding unimpressed films in front of corresponding short lengths of the film to be printed and means whereby the rotation of the drum provides for the operation of said series of couples of spools.

2. A printing machine for photographic and kinematographic films comprising a rotary hollow drum, a source of light inside same, an at least part cylindrical optical member lying substantially in a plane perpendicular to the drum and passing through the source of light, a cylindrical series of sprocket teeth rigid with the drum and adapted to drive the film to be printed in front of the optical element, a feed and a take up spool for said films in front of the corresponding ends of the passage thereof in front of the optical element, means whereby the rotation of the drum controls the unwinding of the film to be printed from one spool to the other in at least one selected direction, a series of couples of feed and take up spools arranged on opposite sides of the path of the film to be printed in front of the optical element and adapted to provide for the unwinding and rewinding of corresponding unimpressed films in front of corresponding short lengths of the film to be printed and means whereby the rotation of the drum provides for the operation of said series of couples of spools.

3. A printing machine for photographic and kinematographic films comprising a rotary hollow drum, a source of light inside same, an at least part cylindrical optical member lying substantially in a plane perpendicular to the drum and passing through the source of light, means for engaging the films to be printed over the periphery of the drum in front of the optical element, a feed and a take up spool for said film in front of the corresponding ends of the passage thereof in front of the optical element, a double sunwheel perpendicular to he axis of the drum and rigid therewith, a pinion adapted to cooperate with either elementary sunwheel and controlling the operation of said feed and take up spool in at least one selected direction, a series of couples of feed and take up spools arranged respectively to either side of the path of the film to be printed in front of the optical element and adapted to provide for the unwinding and rewinding of corresponding unimpressed films in front of a short length of the film to be printed, a pinion adapted to engage selectively each of the elementary sunwheels and to control the corresponding couple of spools and means for controlling the selective engagement of either elementary sunwheel with the different pinions mentioned whereby the rotation of the drum provides for the operation of said series of couples of spools and of the first mentioned spools.

4. A method of making copies of photographic and kinematographic films comprising moving a master film in a circular path about a single light source, simultaneously moving a plurality of unexposed copy films in printing relation with the master film through circumferentially spaced portions of said circular path, feeding and withdrawing the copy films in directions at an angle to the plane of said circular path of movement of the master film, and looping and twisting the copy films from the direction of feed to the direction of travel with the master film and back to the direction of withdrawal.

5. A method of making copies of photographic and kinematographic films comprising moving a pair of master films in circular paths about a single light source, the planes of said pairs being spaced apart and parallel, simultaneously moving a plurality of unexposed copy films first in printing relation with one master film, and subsequently in printing relation with the second master film through circumferentially spaced portions of said circular path, feeding and withdrawing the copy films in directions at an angle to the planes of the circular paths of the master films, twisting the copy films and double looping the same from their direction of feed to printing positions with both master films and back to the direction of withdrawal.

6. A method for contact printing from a plurality of negative films onto a single sensitive copy film comprising the steps of passing the plurality of negative films past an exposure area, said negative films being parallel to each other and in the same plane at said exposure area, passing the sensitive copy film at an angle to the paths of travel of said negative films, twisting said sensitive copy film so that it will lie parallel to and in contact with one of said negative films at the exposure area, then reversely looping and twisting said sensitive copy film so that it will lie parallel to and in contact with the other of said negative films at the exposure area, and simultaneously exposing the negative films and the sensitive film at the exposure area to a single source of light.

FERDINAND EICHINGER.

REFERENCES CITED

The following references are of record in the file of this patent:

UNITED STATES PATENTS

| Number | Name | Date |
| --- | --- | --- |
| 1,335,860 | Shapiro | Apr. 6, 1920 |
| 1,604,485 | Salins | Oct. 26, 1926 |
| 2,039,213 | Debrie | Apr. 28, 1936 |

FOREIGN PATENTS

| Number | Country | Date |
| --- | --- | --- |
| 537,668 | France | Mar. 7, 1922 |